United States Patent
Alsio

(10) Patent No.: US 6,748,281 B2
(45) Date of Patent: Jun. 8, 2004

(54) WEARABLE DATA INPUT INTERFACE

(76) Inventor: Gunilla Alsio, Katrinebergsbacken 16, 117 61, Stockholm (SE)

(*) Notice: Subject to any disclaimer, the term of this patent is extended or adjusted under 35 U.S.C. 154(b) by 0 days.

(21) Appl. No.: 10/362,765

(22) PCT Filed: Sep. 27, 2001

(86) PCT No.: PCT/SE01/02096
§ 371 (c)(1),
(2), (4) Date: Feb. 24, 2003

(87) PCT Pub. No.: WO02/27456
PCT Pub. Date: Apr. 4, 2002

(65) Prior Publication Data
US 2003/0179224 A1 Sep. 25, 2003

Related U.S. Application Data
(60) Provisional application No. 60/237,343, filed on Sep. 29, 2000.

(51) Int. Cl.[7] .............................................. G05B 15/00
(52) U.S. Cl. ......................... 700/83; 700/258; 345/157
(58) Field of Search ............................. 700/83, 84, 85, 700/180, 159, 252; 345/157, 156, 158; 341/122, 173, 137, 22; 382/140

(56) References Cited

U.S. PATENT DOCUMENTS 5,097,252 A * 3/1992 Harvill et al. ............... 340/540
5,796,354 A * 8/1998 Cartabiano et al. .......... 341/22
6,285,757 B1 * 9/2001 Carroll et al. ............... 345/619
6,380,923 B1 * 4/2002 Fukumoto et al. .......... 345/156

FOREIGN PATENT DOCUMENTS

EP      0696014      * 7/1996
GB      98/24017     * 6/1998

* cited by examiner

Primary Examiner—Leo Picard
Assistant Examiner—Kidest Bahta
(74) Attorney, Agent, or Firm—Rolf Fasth; Fasth Law Offices

(57) ABSTRACT

The method is for entering data into a computer device (11) and comprises providing a wearable device (10) that is attached to a hand (200). The device (10) has extensions (14, 16, 18, 20, 22) disposed below metacarpophalangeal joints (212) and first bone segments (202) of the fingers (208). The extensions (14, 16, 18, 20, 22) have sensors (50, 52, 54, 56, 58) in operative engagement with sensor channels (15, 17, 19, 21, 23) mounted thereon. The first bone segments (202) may be moved relative to second bone segments (214) at the metacarpophalangeal joints (212) to bend at least one of the sensor channels (15, 17, 19, 21, 23). One of the sensors (50, 52, 54, 56, 58) sensing the bending of one the sensor channels (15, 17, 19, 21, 23) and sending an activation signal (57) to a computer device (11) in operative engagement with the device (10).

10 Claims, 3 Drawing Sheets

WEARABLE DATA INPUT INTERFACE

PRIOR APPLICATION

This application is a U.S. national phase application based on International Application No. PCT/SE01/02096, filed Sep. 27, 2001, claiming priority from U.S. Provisional Patent Application No. 60/237,343, filed Sep. 29, 2000.

TECHNICAL FIELD

The present invention relates to a wearable device for one-handed and two-handed activities that may involve the metacarpophalangeal joint of the hands. The device may be used in the interaction with a computer program.

BACKGROUND AND SUMMARY OF THE INVENTION

Conventional data input interfaces with computers most often requires keyboards. It is sometimes cumbersome to use keyboards especially if the computer or communication device is very small so that each letter or command button is also very small. For example, it is very inconvenient to enter text messages into a mobile phone or PDA because the devices are so small. In other situations, it is simply inconvenient to use a conventional keyboard because there is not sufficient room for the user to use the relatively large keyboards. There is a need for a convenient and reliable way of entering data into a computer device.

The present invention is a method for entering data into a computer device and comprises the steps of providing a wearable device that is attached to a hand. The device has extensions disposed below metacarpophalangeal joints and first bone segments of the fingers. The extensions have sensors in operative engagement with sensor channels mounted thereon. The first bone segments may be moved relative to second bone segments at the metacarpophalangeal joints to bend at least one of the sensor channels. One of the sensors sensing the bending of one the sensor channel and sending an activation signal to a computer device in operative engagement with the device.

DETAILED DESCRIPTION

Figures 1, 2:
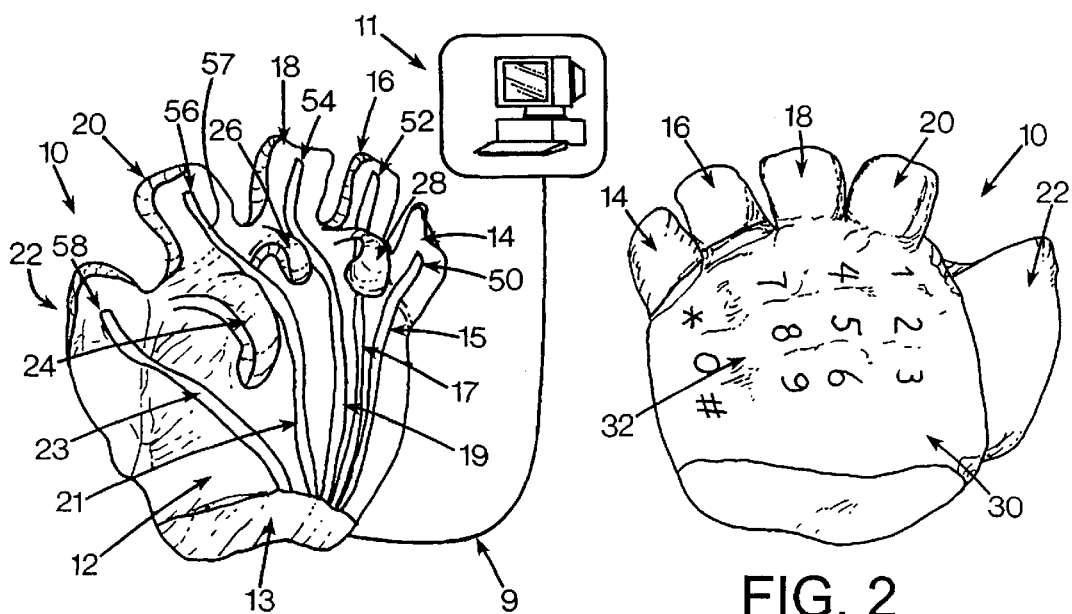
FIG. 1 is a perspective top view of the wearable device for the palm of a right hand.
FIG. 2 is a perspective bottom view of the device of FIG. 1.

With reference to FIGS. 1–5, the present invention is a wearable data input interface device 10 for entering information into, for example, a computer 11 connected thereto without using a conventional keyboard. The device 10 is, preferably, made of a flexible material such as a suitable polymeric material. In the most preferred embodiment, a bio-compatible silicone material may be used. The device 10 has a central area 12 suitable for a right hand 200 of a person and five extensions 14, 16, 18, 20 and 22. Between the extensions 20, 22, there is a relatively large protruding bent hook 24 that extends upwardly and towards the central area 12. Similarly, a smaller hook 26 is disposed between the extensions 18, 20 and a hook 28 is disposed between the extensions 16, 18.

When a person puts her palm of her right hand 200 on the central area 12 so that the proximal phalanx of the fingers, such as the proximal phalanx or bone segment 202, rest on the extensions 14–20 and the thumb 206 rests on the extension 22, the hooks 24, 26, 28 may be engaged by the hand 200 to hold the hand 200 to the device 10 so that the person may lift the hand 200 without loosing the grip of or contact with the device 10. More specifically, the hook 24 grabs the hand between the thumb 206 and the index finger 208, the hook 26 engages the area between the index finger 208 and the middle finger and the hook 28 engages the area between the middle finger and the third finger. In this way, most of the fingers extend beyond the extensions, as described in detail below, and the index finger, middle finger, third finger and little finger rest on the extensions 20, 18, 16, 14 respectively and the thumb rests on the extension 22. The device 10 may be available in different sizes such as small, medium, large and extra large to suit different palm sizes. Because the fingers extend beyond the extensions, there is no need to add any sensors to the finger tips, such as the finger tip 210, and the fingers may be used for other purposes when the person is not interacting with the computer. With a glove and sensors disposed on the finger tips, it is often necessary to remove the gloves before the hands and fingers can be used to do other tasks so as not to damage the sensors on the gloves.

Preferably, the device 10 has a set of built-in channels so that a sensor channel 15 extends from a back 13 of the central area 12 to a mid-portion of the extension 14. Similarly, sensor channels 17, 19, 21 extend to the extensions 16, 18, 20, respectively. When the hand 200 is correctly positioned on the device 10 and the hooks 24, 26, 28 hold the hand 200 in place, the ends of the sensor channels 15, 17, 19, 21 are positioned about half way along the promixal phalanx, such as phalanx 202, and beyond the metacarpophalangeal joints disposed between each finger and the hand 200. For clarity, FIG. 5 only shows a metacarpophalangeal joint 212. A sensor channel 23, best shown in FIG. 1, extends to the extension 22 that supports the thumb 206 of the hand 200 of the person. Similarly, the channel 21 extends to the extension 20 on which the joint 212 and the phalanx 202 may rest. Preferably, the channels are defined inside the polymeric material of the device 10. The extensions 14, 16, 18, 20, 22, preferably, have optical receivers 50, 52, 54, 56, 58 that are disposed at the end of each channel, respectively. For example, when the metacarpophalangeal joint 212 is bent, the receiver 56 receives less light from a transmitter unit 216 disposed, for example, at the back end 13 because the channel 21 is bent. When less light is received by the receiver 56, an activation signal 57 may be transmitted in the channel 21 back to the computer 11, as outlined in more detail below.

An important feature of the present invention is that the movements of the metacarpophalangeal joint 212, disposed between the proximal phalanx 202 and an ossa metacarpalia or the bone segment 214 of the hand 200, is measured. When the metacarpophalangeal joint 212 of the index finger 208 moves, that is the angle between the phalanx 202 and bone segment 214 changes, then the sensor 56 on the extension 20 that bears against the proximal phalanx 202 of the index finger 208 registers this movement. More particularly, the movement in the metacarpophalangeal joint 212 that bears against the extension 20 may be registered by the optical receiver 56 that cooperates with the sensor channel 21 that, in turn, is in operative engagement with the extension 20.

Any suitable type of sensor may be used including, but not limited to, optronics, accelerometers and piezoelectric membranes. Optronical devices is a combination of a light source, light conductor and light receiver that are connected by electronic circuits so that when the metacarpophalangeal joint of a finger is moved, as in typing a letter, the optronical device registers that the length of the light beam is shortened by the bending of one of the channels in the extensions of the device 10. It is also possible to let a light source be generated at the extensions so that when the extensions are bent, less amount of light is transmitted that may be registered by receiver at the bottom of the device 10. Another option is to register any movement of the direction of the light beam.

When the device of the present invention is used as a text input interface device, it is not necessary that the user is actually using a conventional keyboard. It is sufficient to press against a table surface or thigh etc to move the metacarpophalangeal joint.

It is desirable to require a minimum of movement before the receiver of the signals generated by the joint movements draws the conclusion that the joint has moved to make sure that only typing movements of the joint are registered as such.

Accelerometers may register the acceleration of the movement of the joints when the fingers are typing. The peak of the acceleration is reached at the point of the impact of the fingers on the surface below. It is also possible to place piezo-electrical membranes on an inside between the device 10 and the palm to measure stretches and tension in the membrane when the joints, and thus the extensions in operative engagement therewith, move during typing. The signal that may be generated by the joint movements may be in a coded form that is later de-coded at the receiving computer 11. In this way, the user must use the devices 10, 36 in connection with the program in the computer because the program must first decode the signals from the device 10, 36 prior to analyzing the information of the signals.

Figures 3, 4:
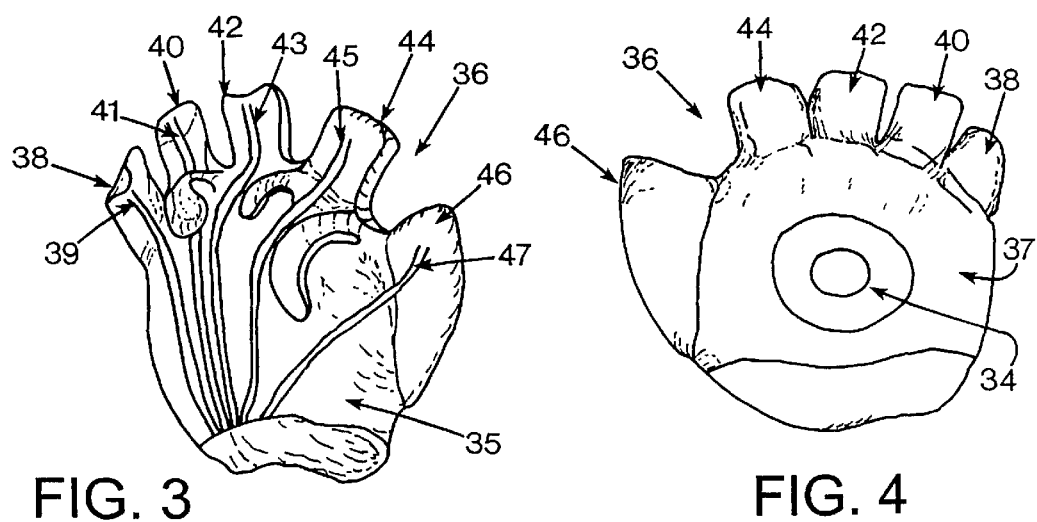
FIG. 3 is a perspective top view of the wearable device for the palm of a left hand.
FIG. 4 is a perspective bottom view of the device of FIG. 3.
Figure 5:
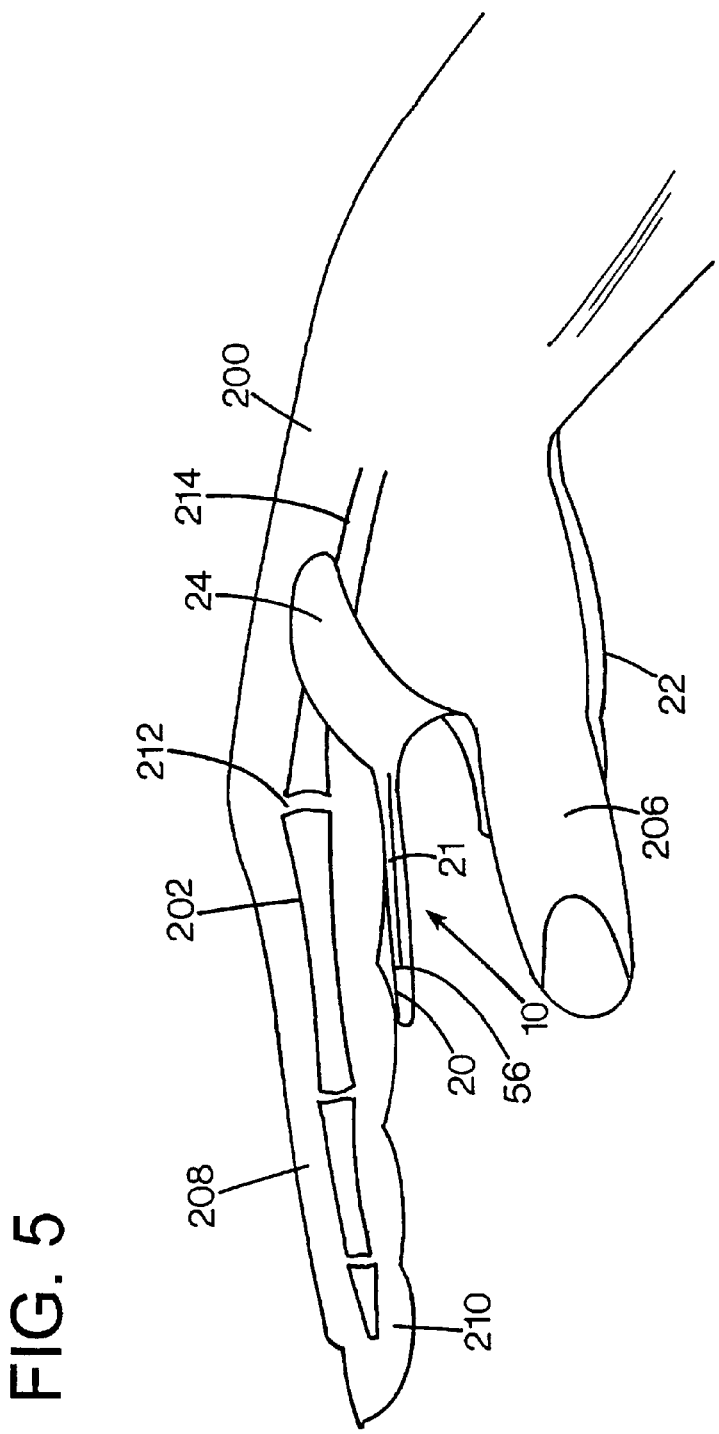
FIG. 5 is a perspective view of the wearable device shown in FIG. 1 mounted in a hand.

FIG. 2 shows an underside 30 of the device 10 that has a numeric keypad 32 removably attached to the underside 30. The keypad 32 is similar to a keypad of a modern telephone with digits from 0 to 9 and * and # buttons. Additional keys may be added, e.g. +, − and /. The keypad 32 may have sensors, such as piezo-electrical membranes, under each digit of the keypad. FIG. 3 shows an upperside 35 of a device 36 that has extensions 38–46 for a left hand of a person. Similar to the device 10, the device 36 has built in sensor channels 39–47 that extend across the device 36 and terminate at the extensions 38–46, respectively. FIG. 4 shows an underside 37 having a mouse arrangement 34 that may be removably attached to the underside 37. The keypad 32 and the mouse 34 are connected to the computer 11 and may function the same way as a conventional keypad of a keyboard and a free standing mouse. In other words, by pressing the buttons on the keypad 32, the desired digits appear on the computer 11 and the cursor may be moved and activated by the mouse 34. The keypad 32 and the mouse 34 may be attached to either the left or right hand of the person using the device 10, as desired by the user. For example, if the keypad is attached to the underside of the device 10 on the right hand of the user, the user may use the left hand to punch in numbers on the keypad 32.

Of course, the keypad 32 and the mouse 34 may be removed from the devices 10, 36 when it is only necessary to enter text data into the computer 11.

The signals from the sensor channels in the devices 10, 36 may be transmitted wireless to the computer 11 with, for example, the use of "Bluetooth" technique. It may also be possible to transmit the signal via a wire 9 that is connected to the computer 11.

When the devices are used as a text input interface, the devices 10, 36 transmit signals back to the computer 11 that detects which extension is activated and in which order the extensions are activated to determine the most likely words or sentences typed. It is important to note that it is not necessary for the operator to hit a specific spot on the table or whatever surface the fingers are hitting. It is enough to move the joints sufficiently to transmit a signal regardless where on the table surface the finger tips hit. For example, when the user moves the joint of the right index finger, the extension 20 transmits the activation signal 57 back to the computer 11.

Figure 6:
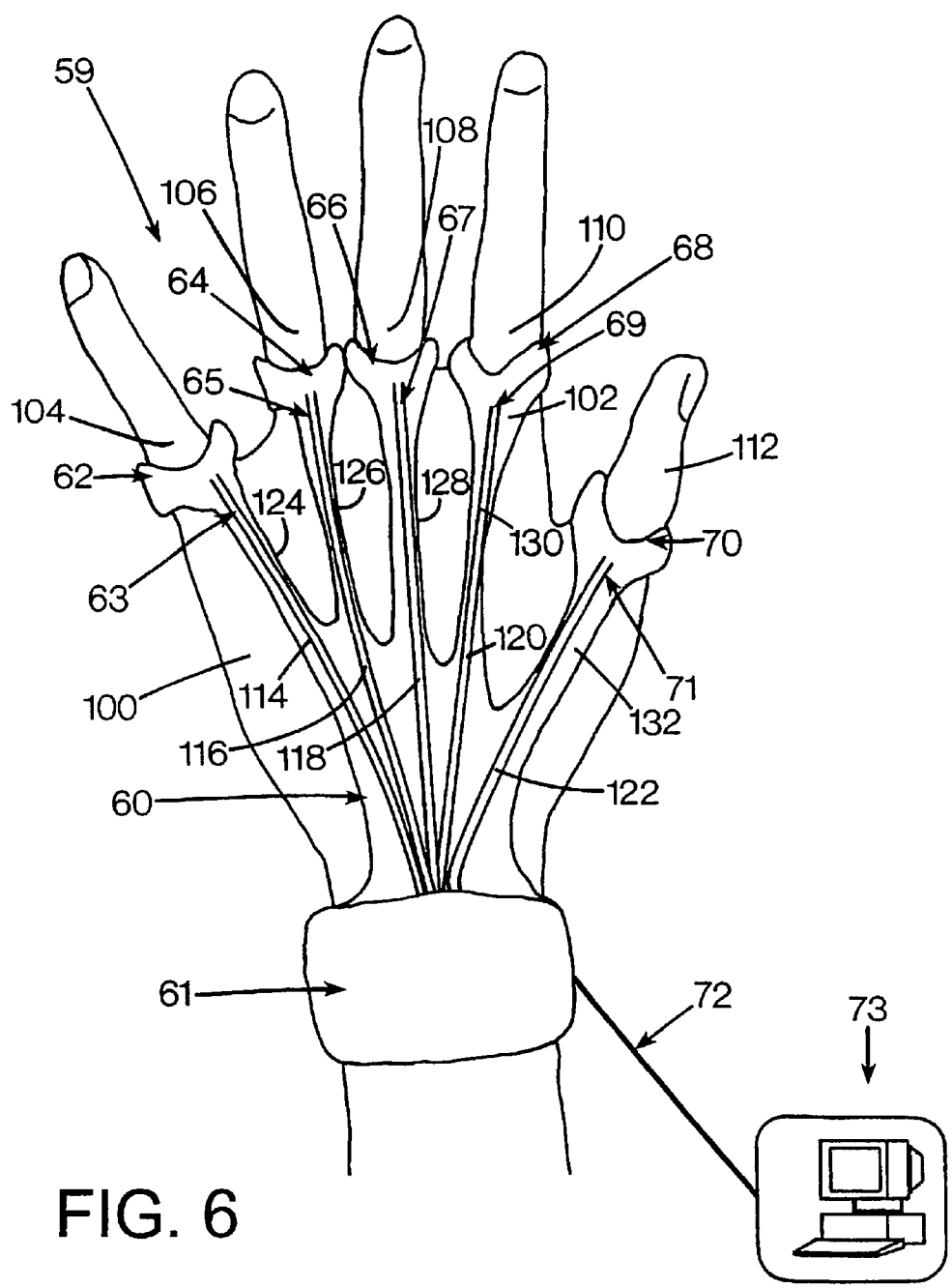
FIG. 6 is a perspective top view of an alternative embodiment of the wearable device for the back of a left hand.

FIG. 6 shows a perspective top view of an alternative embodiment of a device 59 of the present invention that is adapted to be fitted on the back of a left hand 100. One advantage of having the device 59 on the back of the hand is that it frees up the inside of the hand for other tasks. In this way, all the measurements of the finger movements are performed on the back of the hand and the fingers, as described in detail below.

The device 59 and its sensor technique are very similar to the earlier described devices and works according to the same principles. More particularly, the device 59 has a wrist section 61 that may be a bendable material that is attached around the wrist of the left hand 100. The section 61 may include a processor, power source and other items to drive the device 59.

The device 59 has a flexible and conforming layer 60. The layer 60 is made of a suitable material such as a silicone polymer or any other suitable material. One function of the layer 60 is to maintain a flexible shape of the device so that the sensors are not tangled up. An upper segment 102 of the layer 60 has grip portions 62, 64, 66, 68 and 70 that may engage bottom portions of fingers 104, 106, 108, 110 and a thumb 112, respectively. The grip portions may b have a semi-circle shape that firmly holds the finger while at the same time the grip portions are easily removable. The grip portions may also form a full circle so that the fingers are inserted into openings formed therein. The layer 60 has channels 63, 65, 67, 69, and 71 defined therein that extend from a middle portion of the wrist section 61 to the grip portions 62, 64, 66, 68 and 70, respectively. The channels are adapted to contain sensors such as sensors 114, 116, 118, 120 and 122, respectively, that are connected to the wrist section 61 so that signals may be transferred to the computer 73 for further analysis. Any suitable sensor may be used to detect the movement of the hand/fingers, particularly the movement of the metacarpophalangeal joints. By using the sensors to measure movements of the joints on the back of the hand, the accuracy of the measurements may be improved because the movements of the joints are more distinct than the movements that are measured on the inside of the hand. Suitable sensors may include, but not be limited to, optronics, accelerometers and piezoelectric membranes. As described above, when the metacarpophalangeal joints are bent, the receivers at the wrist device 61 of the device 59 receive less light from the sensors because the channel is bent. When less light is received by the receivers, an activation signal may be transmitted back to the computer 73, as described in detail above for the first embodiment of the present invention.

For extra comfort, the skin of the back of the hand 100 may be exposed between thin finger-like sections 124, 126, 128, 130 and 132. The exposure may reduce the perspiration of the back of the hand and to make it more comfortable to wear the device 59.

The wrist section 61 may be connected to the computer 73 via a cable 72. The wrist section 61 may also be connected to the computer 73 via wireless technology such as the Bluetooth technology. Similar to the first embodiment, the device 59 may be equipped with a mouse or calculator function that is disposed on the inside of the hand 100. The device 59 may be adapted to be fitted on a right hand also by changing the order of the various grip portions so that the user has a device on each hand.

While the present invention has been described in accordance with preferred compositions and embodiments, it is to be understood that certain substitutions and alterations may be made thereto without departing from the spirit and scope of the following claims.

What is claimed is:

1. A method of entering data into a computer device, comprising:

providing a wearable device (10) having an extension (14, 16, 18, 20, 22), the extension (14, 16, 18, 20, 22) having a sensor (50, 52, 54, 56, 58) in operative engagement with a sensor channel (15, 17, 19, 21, 23) mounted thereon;

placing a hand (200) on top of the device (10) so that the extension (14, 16, 18, 20, 22) is positioned immediately below a metacarpophalangeal joint (212) and a first bone segment (202) of the hand (200) and the sensor channel (15, 17, 19, 21, 23) extends under and across the joint (212) and into the extension (14, 16, 18, 20, 22);

moving the first bone segment (202) to change a direction of the bone segment (202) relative to a second bone segment (214) of the hand (200) at the metacarpophalangeal joint (212);

the movement of the bone segment 202 bending the sensor channel (15, 17, 19, 21, 23) that extends across the metacarpophalangeal joint (212);

the sensor (50, 52, 54, 56, 58) sensing the bending of the sensor channel (15, 17, 19, 21, 23) due to the change of direction of the bone segment (202) at the metacarpophalangeal joint (212); and the sensor (50, 52, 54, 56, 58) sending an activation signal (57) to a computer device (11) in operative engagement with the device (10).

2. The method according to claim 1 wherein the method further comprises carrying a first amount of light in the sensor channel (15, 17, 19, 21, 23).

3. The method according to claim 2 wherein the method further comprises the sensor (50, 52, 54, 56, 58) being an optronical device (50, 52, 54, 56, 58) for sensing the amount of light carried in the sensor channel (15, 17, 19, 21, 23).

4. The method according to claim 3 wherein the method further comprises the optronical device (50, 52, 54, 56, 58) sending the activation signal (57) to the computer device (11) when a second amount of light is sensed and the second amount is less than the first amount of light.

5. The method according to claim 1 wherein the method further comprises providing the device (10) with hooks (24, 26, 28) to attach the device (10) to the hand (200).

6. The method according to claim 1 wherein the method further comprises providing the device (10) with an underside (30) having a keypad (32).

7. The method according to claim 1 wherein the method further comprises providing the device (36) with an underside (37) having a mouse arrangement (34) mounted thereon.

8. The method according to claim 1 wherein the method further comprises the computer device (11) receiving the activation signal (57) and displaying a command represented by the activation signal (57).

9. The method according to claim 8 wherein the method further comprises the computer device (11) displaying a letter in response to the activation signal (57).

10. The method according to claim 1 wherein the method further comprises connecting the device (10) to the computer device (11) by wireless technology.

* * * * *